US010406925B2

(12) United States Patent
Lee et al.

(10) Patent No.: US 10,406,925 B2
(45) Date of Patent: Sep. 10, 2019

(54) WIRELESS CHARGING SYSTEM FOR DEVICES IN A VEHICLE

(71) Applicant: Robert Bosch GmbH, Stuttgart (DE)

(72) Inventors: Huang Lee, Mountain View, CA (US); Benjamin Waters, Kirkland, WA (US); Abtin Keshavarzian, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 14/876,068

(22) Filed: Oct. 6, 2015

(65) Prior Publication Data

US 2016/0096435 A1    Apr. 7, 2016

Related U.S. Application Data

(60) Provisional application No. 62/060,140, filed on Oct. 6, 2014.

(51) Int. Cl.
*B60L 11/18* (2006.01)
*H01F 38/14* (2006.01)
(Continued)

(52) U.S. Cl.
CPC .......... *B60L 11/182* (2013.01); *B60L 53/12* (2019.02); *H01F 38/14* (2013.01); *H02J 50/12* (2016.02);
(Continued)

(58) Field of Classification Search
CPC ........ B60L 11/182; H01F 38/14; H02J 50/12; H02J 7/1438; B60R 16/03; B60R 16/0315; B60R 21/017; Y02T 10/7005
(Continued)

(56) References Cited

U.S. PATENT DOCUMENTS 9,287,736 B2 * 3/2016 Lee .................... H02J 17/00
2010/0201189 A1    8/2010 Kirby et al.
(Continued)

FOREIGN PATENT DOCUMENTS

EP          2765682 A1    8/2014
KR    10-20140029895 A    3/2014
(Continued)

OTHER PUBLICATIONS

International Search Report and Written Opinion corresponding to PCT Application No. PCT/US2015/054198, dated Jan. 22, 2016 (14 pages).
(Continued)

*Primary Examiner* — Thienvu V Tran
*Assistant Examiner* — Brian K Baxter
(74) *Attorney, Agent, or Firm* — Maginot Moore & Beck LLP

(57) ABSTRACT

A wireless charging system for use in vehicles includes power transmitting coils which are used for resonant power transfer to power receiving devices in the vehicle. The system includes a detection system for detecting power receiving devices in the vicinity of the transmitting coils so that only the power transmitting coils having objects detected nearby are activated. The system also includes a tuning circuit that enables power transmitting coils to be tuned with respect to each other to increase the power delivery range or detuned with respect to each other to decrease interference between coils.

17 Claims, 3 Drawing Sheets

(51) Int. Cl.
*H02J 50/12* (2016.01)
*H02J 50/40* (2016.01)
*B60L 53/12* (2019.01)

(52) U.S. Cl.
CPC .......... *H02J 50/40* (2016.02); *Y02T 10/7005* (2013.01); *Y02T 10/7072* (2013.01); *Y02T 90/122* (2013.01); *Y02T 90/14* (2013.01)

(58) Field of Classification Search
USPC ........................................................ 307/10.1
See application file for complete search history.

(56) References Cited

U.S. PATENT DOCUMENTS

| | | |
|---|---|---|
| 2010/0231163 A1 | 9/2010 | Mashinsky |
| 2012/0091948 A1 | 4/2012 | Shinde et al. |
| 2012/0161696 A1 | 6/2012 | Cook et al. |
| 2014/0073308 A1 | 3/2014 | Kim |
| 2014/0266018 A1* | 9/2014 | Carobolante ........... H02J 7/025 320/108 |
| 2016/0072298 A1* | 3/2016 | Fine ........................ H02J 7/025 307/104 |
| 2016/0211702 A1* | 7/2016 | Muratov .................. H01F 38/14 |
| 2016/0297305 A1* | 10/2016 | Ichikawa ............... B60L 11/182 |
| 2017/0025901 A1* | 1/2017 | Dela Cruz .............. H02J 5/005 |

FOREIGN PATENT DOCUMENTS

| | | |
|---|---|---|
| WO | 2008050260 A1 | 5/2008 |
| WO | 2013069951 A1 | 5/2013 |

OTHER PUBLICATIONS

Supplementary European Search Report corresponding to European Patent Application No. 15 84 9120 (9 pages).

* cited by examiner

WIRELESS CHARGING SYSTEM FOR DEVICES IN A VEHICLE

CROSS-REFERENCE TO RELATED APPLICATIONS

This application claims priority to U.S. Provisional Application Ser. No. 62/060,140 entitled "WIRELESS CHARGING SYSTEM FOR DEVICES AROUND WINDSHIELD AND DASHBOARD" by Lee et al., filed Oct. 6, 2014, the disclosure of which is hereby incorporated herein by reference in its entirety.

TECHNICAL FIELD

The disclosure relates generally to wireless power transfer and charging systems, and in particular to wireless power transfer and charging systems for use in vehicles.

BACKGROUND

There are many different types of portable electronic devices and equipment that can be used in a vehicle while the vehicle is moving from place to place. Some portable devices are designed to perform a function related to the operation of the vehicle itself, such as global positioning system (GPS) devices and dash-mounted cameras. Many other portable devices, such as cellular phones, tablets, and the like, are capable of being carried and used by an individual within the vehicle.

Portable electronic devices require power to operate and/or to recharge. Powering and/or charging portable electronic devices in a vehicle typically requires a specially designed power cable which is capable of powering the device from the vehicle's onboard electrical system, e.g., by connecting to the vehicle's cigarette lighter outlet or similar type of outlet. Such outlets are typically limited in number and may be inconveniently positioned within the vehicle. Therefore, there may not be enough outlets or the outlets may not be in the right location to connect all the devices that need to be powered within the vehicle. In addition, some people may not want to even use the devices because the cables can get tangled and make the windshield and dashboard area messy and clustered.

DRAWINGS

DETAILED DESCRIPTION

Figure 1:
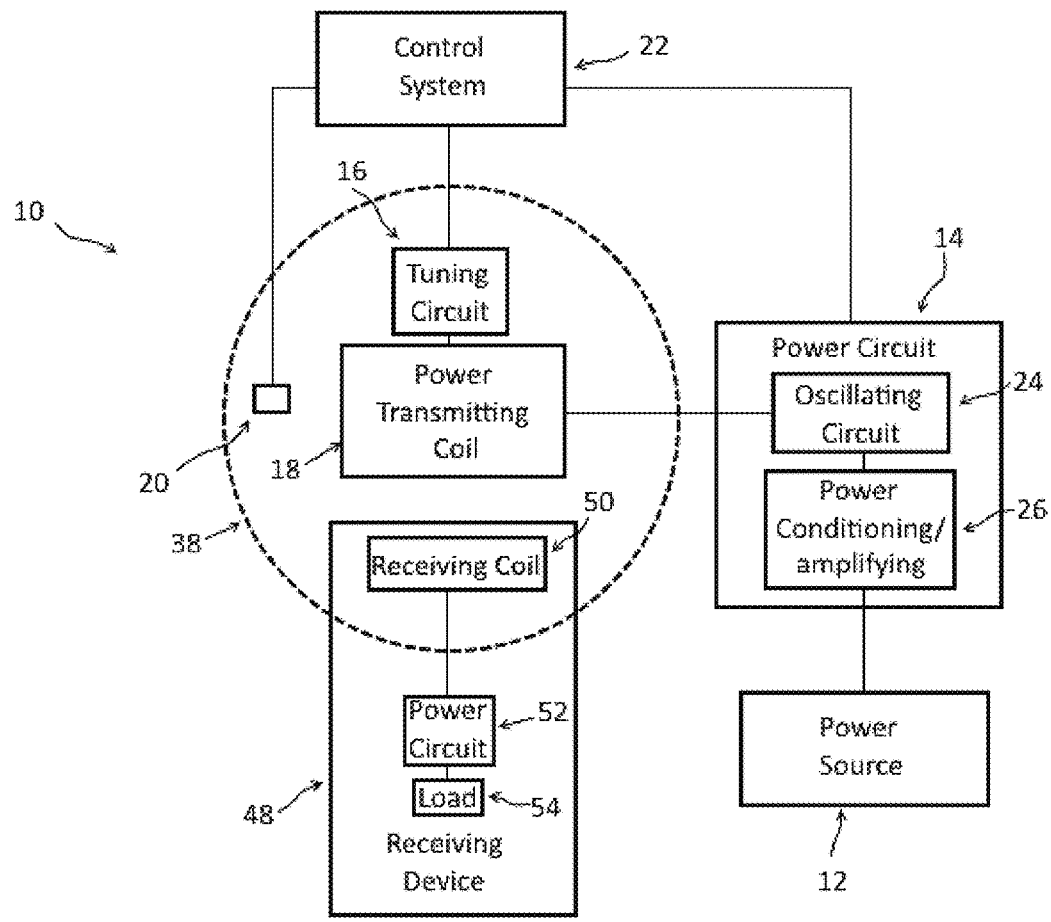
FIG. 1 is a schematic diagram of a wireless charging system in accordance with the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

The disclosure is directed to a wireless charging system for use in vehicles, such as cars and trucks although the charging system may be used in substantially any type of vehicle having the appropriate power source and adequate locations for installation of equipment. The wireless charging system is configured to utilize resonant power transfer to supply power to portable devices. Resonant power transfer can provide high power (up to kilo-Watts) from one transmitter to one receiver with high efficiency (>80%). The distance is also much larger than the conventional inductive charging, which usually delivers power less than 1 cm.

The wireless charging system includes power transmission coils which are configured to generate an oscillating magnetic field from an onboard, vehicular power source, such as a car's electrical system, e.g., battery, alternator, and the like. Electronic devices, including personal electronic portable devices, such as phones, tablets, and video cameras, and vehicle accessories, such as global positioning systems and dash cameras, may be provided with power receiving coils which are capable of receiving energy from the magnetic field from the transmission coils through resonant inductive coupling. The power transmission coils are placed in a plurality of strategic locations within the vehicle to provide power wirelessly to multiple devices. The energy received by the devices can be used to power and/or charge the devices without requiring the use of a wired connection in the vehicle.

Referring to FIG. 1, the wireless charging system 10 includes a power source 12, a power circuit 14, a transmitting coil tuning system 16, power transmitting coils 18, a detection system 20 and a control system 22. The power source 12 may be whatever type of power source that is available on the vehicle, including AC and/or DC power. For example, automobiles, such as cars and trucks, typically have some type of automotive battery which is capable of providing DC power at a certain voltage lever, e.g., 12V. A vehicle's alternator may also be configured to serve as the power source for the power transmission system. In one embodiment, the power source 12 may comprise a dedicated power system, such as a dedicated battery system or energy storage system, which is separate from the vehicle power system. Of course, the system may be configured to receive power from any suitable source, including AC/DC power, solar power, and the like.

The power circuit 14 for a transmitting coil 18 includes a power conditioning/amplifying circuit 24 and an oscillating circuit 26. The power conditioning/amplifying circuit 24 is configured to convert the input power supply from the power source 12 to an appropriate current level, voltage level and/or frequency for use by the system 10. The power conditioning/amplifying circuit 24 may include power amplifiers, voltage regulators, voltage rectifiers, AC/DC converters, DC/DC converters and the like (not shown), as needed, to convert the power from the power source 12 to the desired format for the system. The conditioned power from the power conditioning/amplifying circuit 24 is supplied to the oscillating circuit 26. The oscillating circuit 26 is configured to produce an oscillating energy signal that is used to drive the power transmitting coils 18. The oscillating energy signal has an alternating current which energizes the coil 18 to generate an oscillating magnetic field. Any suitable type of oscillator or oscillating circuit may be used.

The transmitting coil tuning system 16 includes tuning circuitry associated with each coil 18 that may be used to electronically adjust and control the resonant frequency of the power transmitting coils 18. The tuning circuitry for a power transmitting coil 18 may include one or more capacitors, switched capacitors, inductors, and/or switched inductors (not shown). The tuning circuit 16 and the power transmitting coil 18 together form a resonant circuit having a resonant capacitance and resonant inductance. The resonant capacitance and resonant inductance define the resonant frequency of the resonant circuit. The tuning circuit 16 for each transmitting coil 18 includes at least one switch that may be activated to cause a predetermined change in at least one of the resonant capacitance and resonant inductance of the resonant circuit.

As an example, the resonant circuit may include a first (unswitched) capacitor which is connected in a suitable manner with the transmitting coil. The tuning circuit for a transmitting coil may comprise a second capacitor (or capacitance circuit) which is connected in parallel to the first capacitor. A switch is connected in series with the second capacitor which disconnects the second capacitor from the circuit when the switch is open and connects the second capacitor in parallel with the first capacitor when the switch is closed thereby adding the capacitance of the second capacitor to the system. The added capacitance of the second capacitor changes the resonant capacitance, and in turn, the resonant frequency of the resonant circuit. The tuning circuit can be provided in a variety of configurations, comprising one or more capacitors and/or inductors, which result in a predetermined capacitance and/or inductance being added or removed from the resonant circuit when a switch is opened/closed.

Figure 2:
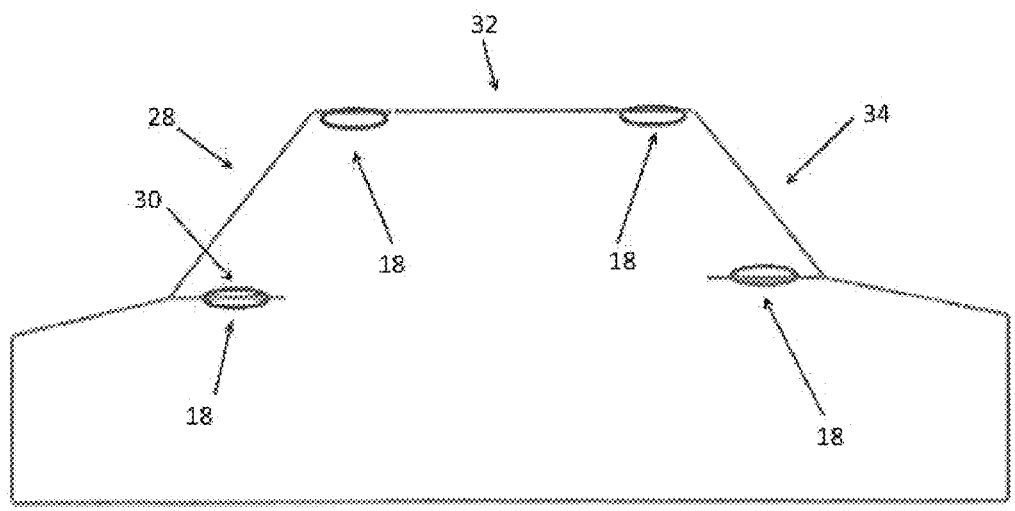
FIG. 2 is a schematic drawing showing possible positions in a vehicle for the power transmission coils of the wireless charging system of FIG. 1.

The power transmitting coils 18 are provided in the vehicle in strategic locations for charging various electronic devices which may be carried, installed, added, or otherwise placed within the vehicle. FIGS. 2-5 depict examples of suitable locations and arrangements for the power transmitting coils. Referring to FIG. 2, power transmission coils 18 may be installed above and/or below the front windshield 28, such as in the dashboard 18 or on the roof 32 of the vehicle, as well as above and/or below the rear windshield 34. Of course, power transmitting coils may be provided at other locations in the vehicle, including the roof and/or floor of a trunk area, within vehicle doors, and in other locations in and around the occupied area of the vehicle (not shown).

Figure 3:
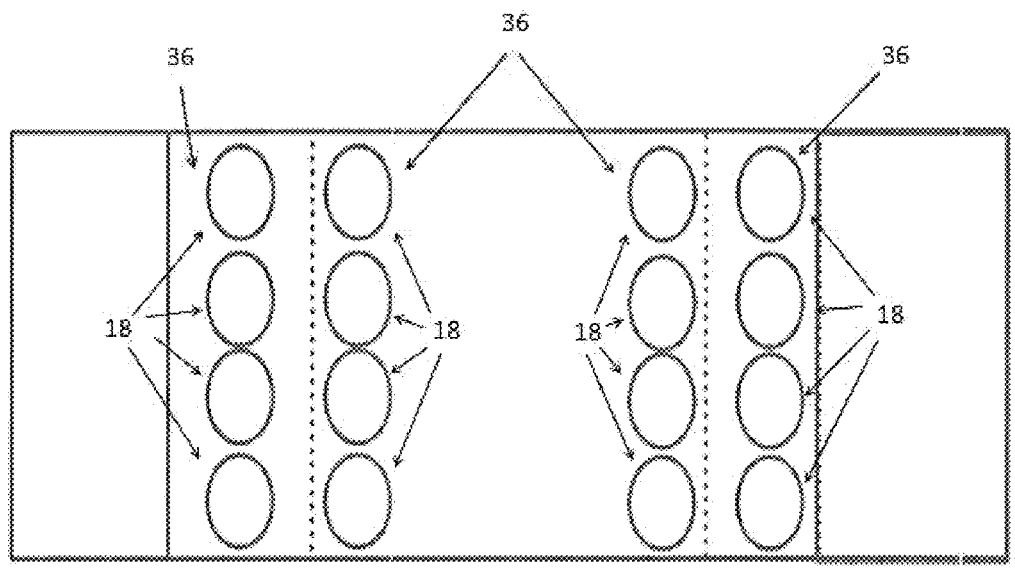
FIG. 3 is a schematic plan view of the power transmission coils of FIG. 2.
Figure 4:
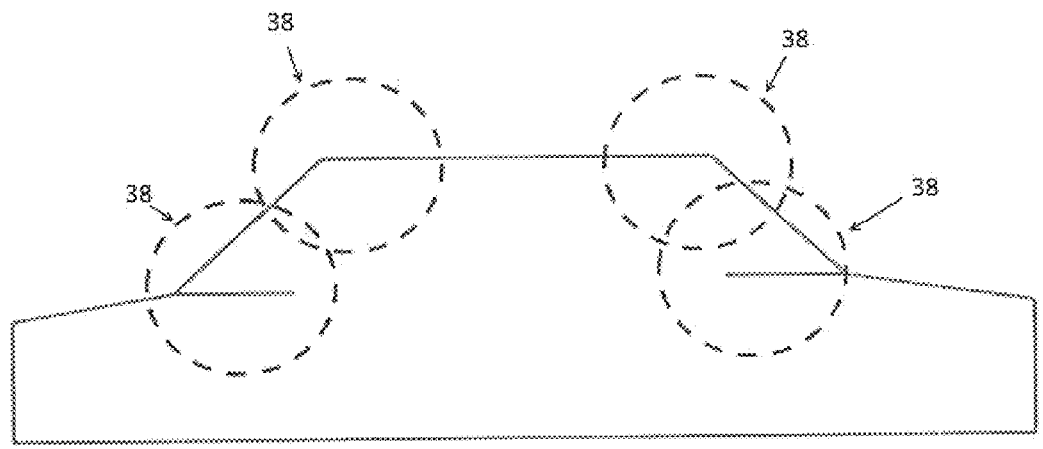
FIG. 4 depicts the power delivery regions for the transmission coils of FIG. 2.

Any suitable number of power transmitting coils 18 may be used in a particular location. In one embodiment, multiple power transmitting coils are arranged in arrays 36 that extend across an area, such across the width of the vehicle above or below the front and rear windshields 28, 34. In FIG. 3, four transmit coils 18 are used in each array 36 although more or fewer coils may be used. As depicted in FIG. 1, a power transmitting coil 18 defines a power zone 38 or region in the vicinity of the coil 18 where the magnetic field generated by the coil is propagated and in turn where power can be delivered to wirelessly to receiving devices. FIG. 4 depicts the power zones 38 generated by the upper and lower transmit coil arrays 36 in the front and rear of the vehicle of FIG. 3.

The number of coils 18 used and positioning of the coils with respect to each other is advantageously selected so that the magnetic fields generated by the coils 18 can overlap to a certain degree as depicted in FIG. 4. The overlap in magnetic fields can eliminate any nulls in wireless power transfer capabilities across the array. When a single coil is used or coils which are spaced far enough apart so that the fields do not overlap, there will typically be null areas where the magnetic field lines of the transmitting coil and a receiving coil destructively interfere with each other. The use of multiple coils which generate overlapping magnetic fields can eliminate these null areas.

Figure 5:
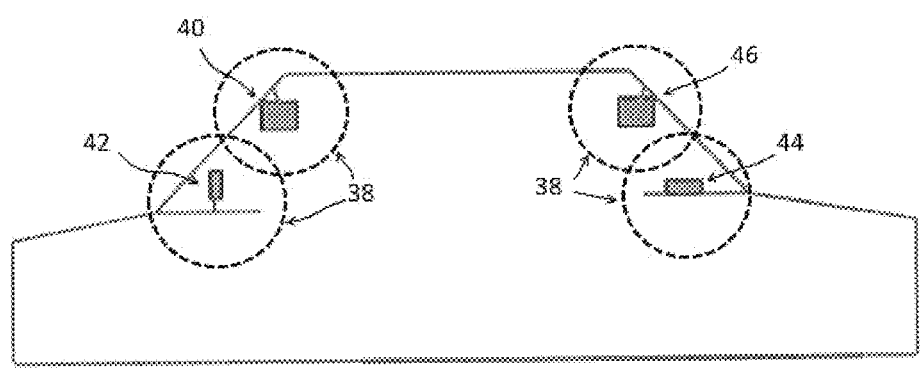
FIG. 5 depicts an exemplary arrangement of receiving devices within the power delivery regions of FIG. 4.

Power receiving devices may be positioned in each power zone to receive power from the transmitting coils. FIG. 5 depicts an example of an arrangement of receiving devices in the power delivery regions of the wireless charging system of FIG. 4. In this example, a dash camera 40 is provided in the front on the windshield near the upper front transmit coil array 36 and a GPS unit 42 is provided on the dashboard near the lower transmit coil array. A cell phone 44 is positioned in the rear dash area to be charged by the lower transmit coil array in the rear of the vehicle, and a rear camera 46 provided on the rear windshield near the upper transmit coil array.

Referring to FIG. 1, each receiving device 48, including dash camera 40, GPS 42, cell phone 44 and camera 46, includes a receiving coil 50 and a power circuit 52. When a receiving device is positioned in a power zone, the oscillating magnetic field generated by the transmitting coil 18 induces an alternating current in the receiving coil 50. The power circuit 52 is configured to use the alternating current use the alternating current induced in the receiving coil 50 to generate power to deliver to a load 54 which may comprise the power system of the receiving device 48 and/or an energy storage device of the receiving device 48, such as a battery.

Referring to FIG. 1, the wireless charging system 10 includes a detection system 20 that is configured to detect when a power receiving device 48 is located in a power zone 38 and to identify the power zones 38 in which the receiving devices 48 are located so that only the power transmitting coils 18 for the power zones 38 in which receiving devices are located are activated to transmit power. The detection system 20 for a power zone 38 includes one or more sensors, detectors, and similar devices that are capable of outputting a detection signal or otherwise indicating when a receiving device is in a power zone.

Any suitable detection mechanism and/or methodology may be used. For example, the detection system 20 may be configured to utilize capacitive sensing as a means to detect the presence of objects in the power zones. The detection system 20 may also utilize optical methods for detecting objects in power zones, such as image sensors, cameras, infrared detectors, and the like. In another embodiment, the detection system may utilize mechanical methods for detecting receiving devices, such as mechanical switches which can be moved in response to being contacted by a device. Mechanical switching can be associated with docking structures or retaining structures (not shown) which may be provided in the power zones to facilitate retention of receiving devices in the power zone.

The system may also include current monitoring circuits (not shown) associated with each of the power transmitting coils 18 for monitoring the current draw on the coils. The current monitoring circuits output signals indicative of the current level in the transmitting coil and therefore can be used to detect the current draw from the associated power transmitting coil. Monitoring current draw from the transmitting coils enables information to be determined about the receiving device.

The control system 22 is operably coupled to the detection system, current monitoring circuitry, the power circuit and the tuning system for the transmitting coils. The control system 22 may comprise a centralized control system in which a central controller controls the operating frequency, the power level, and the tuning of all of the power transmitting coils. Alternatively, the control system 22 may be a distributed control system in which a separate controller is associated with each coil that is configured to set the operating frequency, the power level, and the tuning of the associated transmitting coil. Controllers may comprise a processing device, such as a central processing unit (CPU), an application specific integrated circuit (ASIC), a field programmable gate array (FPGA) device, or a microcontroller. A controller may be configured to execute programmed instructions to operate the system components in accordance with predetermined operation schemes. The programmed instructions may be stored in a memory that is accessible by the controller. Any suitable type of memory or electronic storage may be used.

The control system 22 is configured to control the power circuit 14 and the tuning system 16 for the transmitting coils 18 so that the coils are operated based in part on the output of the detection system. For example, the control system 22 may be configured to control the power circuit 14 so that oscillating energy signals are only provided to the transmitting coils 18 associated with power zones 38 in which receiving devices have been detected by the detection system 20. The oscillating energy signal is not supplied to coils associated with power zones in which no devices have been detected so that power is used efficiently.

The control system 22 is configured to receive the output of the current monitoring circuits indicative of the current draw on the power transmitting coils and may be configured to adjust the driving signal to the coil based on the current draw. For example, the control system may be configured to cut off power to the coil if the current draw indicates that a foreign object may be located in the power zone of a coil. The control system may also be configured detect changes in the load power requirement of a receiving device and adjust the power output of the coils accordingly.

In one embodiment, the control system 22 is configured to operate the tuning system 16 to adjust the resonant frequency of one or more transmitting coils 18 so that the resonant frequency of a transmitting coil more closely matches a resonant frequency of a receiving device 48. Adjusting the resonant frequency of a transmitting coil 18 to more closely match the resonant frequency of a receiving device 48 improves the resonant inductive coupling between the transmitting and receiving coils and enables more efficient power transfer.

The control system 22 may be configured to use the tuning system 16 to adjust the resonant frequency of each transmitting coil 18 individually and independently based in part on the outputs of the detection system. For example, in one embodiment, the control system 22 may be configured to adjust the resonant frequency of a first transmitting coil to more closely match the resonant frequency of a first receiving device which is located in the power zone of the first coil and to adjust the resonant frequency of a second transmitting coil to more closely match the resonant frequency of a second receiving device which is located in the power zone of the second transmitting coil. The adjustment of resonant frequencies of course can be extended to more than a first and a second transmitting coil.

In accordance with the present disclosure, the control system is also configured to operate the tuning system 16 of the coils 18 in order to tune and/or detune the power transmitting coils 18 with respect to each other. As used herein, the term "tune" and "tuning" refers to the adjustment or setting of the resonant frequency of a power transmitting coil to a tuned resonant frequency which may correspond to the natural resonant frequency of the transmitting coil or may correspond to the resonant frequency of at least one other transmitting coil which is being used to transmit power. The term "detune" and "detuning" refers to the adjustment or setting of the resonant frequency of a power transmitting coil to a detuned resonant frequency which may be different from the natural resonant frequency of the transmitting coil or may be different from the resonant frequency of at least one other coil.

By enabling each transmitting coil to be tuned/detuned individually, a variety of different control schemes and functions may be implemented by the controller. In one embodiment, the control system 22 is configured to detune the power transmitting coils 18 that do not have power receiving devices located in their power zone 38. Detuning the transmitting coils that are not being used to transmit power to receiving devices can decrease the electromagnetic (EM) field that is around the detuned coil thereby decreasing interference and minimizing leakage fields around the exterior of the charging system.

The control system 22 may also be configured to tune the power transmitting coils 18 that do not have power receiving devices located in their power zone and that are not being driven to transmit power. The tuning of a transmitting coil 18 that is not being used to transmit power can be used to extend the EM field generated by nearby transmitting coils which are being used to transmit power thereby effectively increasing the power delivery range of the transmitting coils which are transmitting power. By the same token, the control system 22 may be configured to cause a power transmitting coil to generate an EM field that is intended to nullify the magnetic field(s) generated by other coils. Nullifying magnetic fields can be used decrease EM interference from coils not being used to transmit power.

In one embodiment, the control system is configured to operate the transmitting coils in four different states:
(1) Neutral: The neutral state implies that no power is transmitted to the given coil.
(2) Repeater: The repeater state implies that the given coil is tuned and can be used to relay power from one neighboring coil to another.
(3) Singular: The singular state implies that the given coil transmits power to one or more receive devices, but not to neighboring transmit coils. This can be achieved by detuning the given coil with respect to nearby coils.
(4) Nullifier: The nullifier state implies that the given coil is driven to generate an EM field that is intended to cancel the EM field generated from its neighbor.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A wireless power transfer system for a vehicle, comprising:
   a power source;
   a plurality of power transmitting coils disposed at a plurality of predetermined positions in the vehicle, the predetermined positions in the vehicle defining power zones within the vehicle, the plurality of power transmitting coils each being configured to generate an oscillating energy field in response to receiving an oscillating drive signal;

a power circuit for supplying the oscillating drive signal to the plurality of power transmitting coils;

a transmitting coil tuning system operably coupled to the plurality of power transmitting coils and configured to selectively adjust a resonant frequency of each respective power transmitting coil from a first resonant frequency to a second resonant frequency;

a detection system in the vehicle configured to detect when power receiving devices are located within the power zones; and a control system operably coupled to the power circuit, the plurality of power transmitting coils, the transmitting coil tuning system and the detection system, the control system being configured to cause the power circuit to selectively supply the oscillating drive signal to each respective power transmitting coil and to control the transmitting coil tuning system to selectively adjust the resonant frequencies of the plurality of power transmitting coils from the first resonant frequency to the second resonant frequency based at least in part on output of the detection system.

2. The system of claim 1, wherein the plurality of power transmitting coils include an array of power transmitting coils arranged in at least one of a dashboard area and a windshield area of the vehicle.

3. The system of claim 2, wherein the array of power transmitting coils includes at least three coils.

4. The system of claim 1, wherein the control system is configured to cause the power circuit to supply the oscillating drive signal to only power transmitting coils disposed in power zones in which the detection system has detected power receiving devices.

5. The system of claim 1, wherein the control system is configured to cause the transmitting coil tuning system to adjust the resonant frequency of each of the plurality of power transmitting coils such that a first power transmitting coil of the plurality of power transmitting coils and a second power transmitting coil of the plurality of power transmitting coils resonate at a same resonant frequency in response to the detection system detecting a first power receiving device in the power zone of the first power transmitting coil.

6. The system of claim 1, wherein the control system is configured to cause the transmitting coil tuning system to adjust the resonant frequency of each of the plurality of power transmitting coils such that a first power transmitting coil of the plurality of power transmitting coils resonates at a first resonant frequency and a second power transmitting coil of the plurality of power transmitting coils resonates at a second resonant frequency in response to the detection system detecting a first power receiving device in a power zone of the first power transmitting coil.

7. The system of claim 1, wherein the control system is configured to cause the transmitting coil tuning system to adjust the resonant frequency of each of the plurality of power transmitting coils such that a first power transmitting coil of the plurality of power transmitting coils resonates at a first resonant frequency and a second power transmitting coil of the plurality of power transmitting coils resonates at a second resonant frequency, the second resonant frequency being selected such that an oscillating energy field generated by the second power transmitting coil nullifies an oscillating energy field generated by the first power transmitting coil.

8. A wireless power transfer system for a vehicle, comprising:

a power source;

a plurality of power transmitting coils disposed at a plurality of predetermined positions in the vehicle, the predetermined positions defining power zones within the vehicle, the plurality of power transmitting coils each being configured to generate an oscillating energy field in response to receiving an oscillating drive signal;

a transmitting coil tuning system operably coupled to the plurality of power transmitting coils and configured to selectively adjust a resonant frequency of each respective power transmitting coil from a first resonant frequency to a second resonant frequency;

a detection system in the vehicle configured to detect when power receiving devices are located within the power zones; and a control system operably coupled to the power source, the plurality of power transmitting coils, the transmitting coil tuning system and the detection system, wherein the control system is configured to operate the plurality of power transmitting coils in a plurality of different states depending in part on an output of the detection system, wherein the plurality of different states include a neutral state in which the oscillating drive signal is not provided to the respective power transmitting coil, wherein the plurality of different states include a repeater state in which the resonant frequency of the respective power transmitting coil is set to a same resonant frequency as at least one other power transmitting coil such that power is transferred between the respective power transmitting coil and the at least one other power transmitting coil, wherein the plurality of different states include a singular state in which the resonant frequency of the respective power transmitting coil is set at a different resonant frequency from all other power transmitting coils, and wherein the plurality of different states include a nullifier state in which the respective power transmitting coil is driven such that the oscillating energy field generated by the respective power transmitting coil nullifies the oscillating energy field generated by another power transmitting coil.

9. The system of claim 8, wherein the plurality of power transmitting coils include an array of power transmitting coils arranged in at least one of a dashboard area and a windshield area of the vehicle.

10. The system of claim 8, wherein the array of power transmitting coils includes at least three coils.

11. The system of claim 9, wherein the control system is configured to supply the oscillating drive signal to only power transmitting coils disposed in power zones in which the detection system has detected power receiving devices.

12. A wireless power transfer system for a vehicle, comprising:

a plurality of power transmitting coils disposed at a plurality of predetermined positions in the vehicle, the predetermined positions in the vehicle defining power zones within the vehicle, the plurality of power transmitting coils each being configured to generate an oscillating energy field in response to receiving an oscillating drive signal;

a power circuit for supplying the oscillating drive signal to the plurality of power transmitting coils;

a transmitting coil tuning system operably coupled to the plurality of power transmitting coils and configured to selectively adjust a resonant frequency of each respective power transmitting coil from a first resonant frequency to a second resonant frequency;

a detection system in the vehicle configured to detect when power receiving devices are located within the power zones;

a control system operably coupled to the power circuit, the plurality of power transmitting coils, the transmitting coil tuning system and the detection system, the control system being configured to cause the power circuit to supply the oscillating drive signal to each respective power transmitting coil in which the detection system has detected power receiving devices and to control the transmitting coil tuning system such that the power transmitting coils in which no power receiving devices have been detected are detuned with respect to the power transmitting coils in which the detection system has detected power receiving devices.

13. The system of claim 12, wherein the plurality of power transmitting coils include an array of power transmitting coils arranged in at least one of a dashboard area and a windshield area of the vehicle.

14. The system of claim 13, wherein the array of power transmitting coils includes at least three coils.

15. The system of claim 14, wherein the array of power transmitting coils includes four coils that are arrayed across at least one of the dashboard and a roof of the vehicle.

16. The system of claim 12, wherein the plurality of power transmitting coils have different power output capabilities.

17. The system of claim 12, wherein the control system is configured to cause the transmitting coil tuning system to tune the resonant frequencies of at least two power transmitting coils such that the at least two power transmitting coils resonate at a same resonant frequency.

* * * * *